United States Patent [19]

Ohman

[11] Patent Number: 4,697,314
[45] Date of Patent: Oct. 6, 1987

[54] CLAMP FOR HOLDING ROPE FAST

[75] Inventor: Gerth Ohman, Kramfors, Sweden

[73] Assignee: Ergonomen HB, Domsjo, Sweden

[21] Appl. No.: 575,139

[22] Filed: Jan. 30, 1984

[30] Foreign Application Priority Data

Jan. 28, 1983 [SE] Sweden ............................... 8300479
Nov. 7, 1983 [SE] Sweden ............................... 8306074

[51] Int. Cl.$^4$ ............................................. B65D 63/00
[52] U.S. Cl. .................................. 24/132 R; 24/191; 24/193
[58] Field of Search ............ 24/132 R, 132 W L, 191, 24/192, 193, 170, 197, 69 R, 69 S T

[56] References Cited

U.S. PATENT DOCUMENTS

| 48,121 | 6/1865 | Warner | 24/191 |
|---|---|---|---|
| 223,556 | 1/1880 | Thayer | 24/193 |
| 438,912 | 10/1890 | Day, Jr. | 24/170 |
| 749,953 | 1/1904 | Sourek | 24/170 |
| 764,065 | 7/1904 | Mitchell | 24/193 |
| 3,328,856 | 7/1967 | Jonas | 24/191 |

FOREIGN PATENT DOCUMENTS

| 6204 | 12/1840 | France | 24/191 |
|---|---|---|---|
| 141173 | 4/1920 | United Kingdom | 24/191 |

Primary Examiner—Peter A. Aschenbrenner

[57] ABSTRACT

A clamp is provided for securely holding rope, cable and similar material in a fixed position, comprising:
(a) first and second clamping members of which at least one is movable towards and away from the other between clamping and releasing positions in a swinging movement about a pivot point;
(b) the first clamping member having an opening therethrough for reception of a length of rope material to be held in a fixed position and having side walls on opposite sides thereof;
(c) the length of rope material engaging the side wall on one side of the opening in the first clamping member;
(d) the second clamping member having a clamping extension projecting into the opening through the first clamping member when the first and second clamping members are in the clamping position, and spaced away from the opening when the members are in the releasing position;
(e) the extension when the second clamping member is in the clamping position being spaced from the side wall of the opening engaging the length of rope material a distance sufficient to engage and clamp the length in a fixed position between the extension and the side wall;
(f) the first clamping member being shaped at one end so as to define a pivot support and the second clamping member being shaped at one end so as to define a pivot movable in the support so as to swing the other end thereof including the clamping extension between the clamping and releasing positions; and
(g) gripping means on the second clamping member at an end portion opposite the pivot point for manually swinging the member into and away from the clamping position.

2 Claims, 7 Drawing Figures

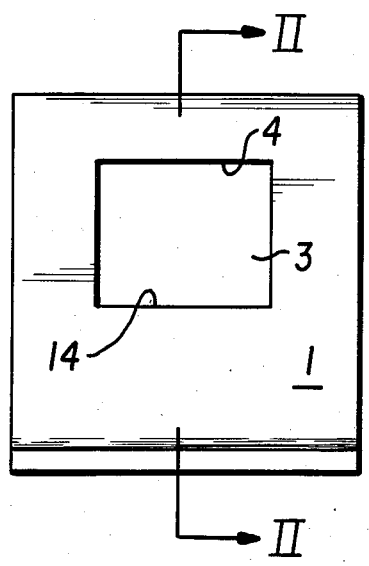
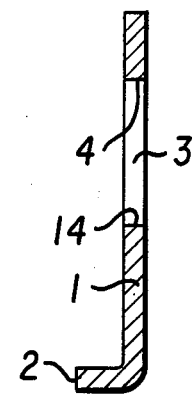
FIG. 1　　　　　FIG. 2
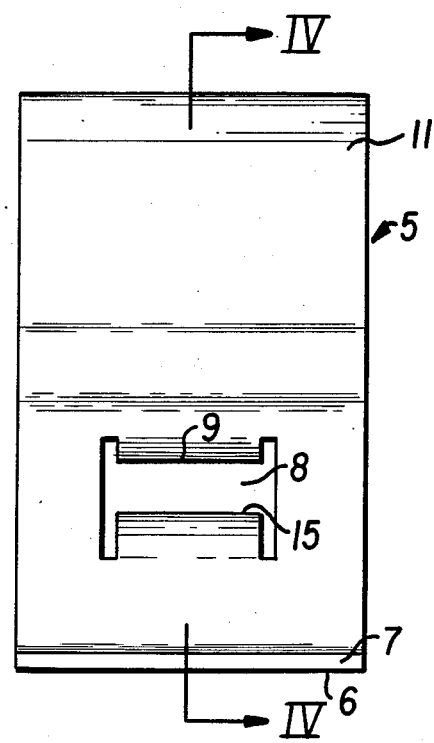
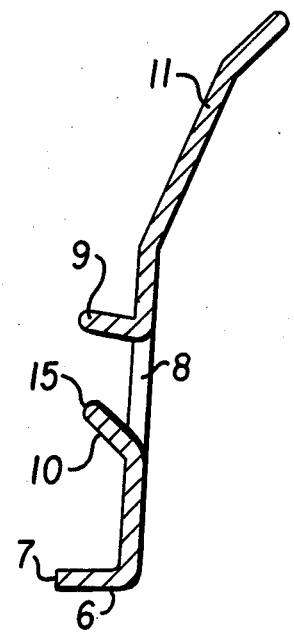
FIG. 3　　　　　FIG. 4

CLAMP FOR HOLDING ROPE FAST

It is frequently necessary when using a cable, rope or like material to mechanical advantage to hold the cable or other rope material in a fixed position, from which it can readily be released when required. Cable clamps are available that are readily moved into an anchoring position, in which the cable or rope is automatically clamped in a fixed position.

A typical device is described in Boenning U.S. Pat. No. 1,605,503, patented Nov. 2, 1926. Boenning notes that cable anchoring members have a body portion with an opening, and a pivoted clamping member adjacent to the opening, or a clamping member in the form of a leaf spring adjacent to the opening, for gripping the cable. In these devices, one threads the cable through the opening in the body portion, but the clamping member is so constructed that it tends to cut the cable while holding it.

Boenning avoids these difficulties by providing the body portion in the form of a hook, with the curved portion of the hook forming a seat for the cable, and the end of the hook spaced from the body portion to form a slot through which the rope can be passed into and out from position in the curved portion of the hook. The cable gripping or engaging member is in the form of a leaf spring, one end of which is rigidly connected to the body portion, and the other end of which has a curved button or cable-engaging member rigidly attached there to for engaging the cable and holding it in the seat. When the cable is Placed in the hook, the button on the leaf spring is forced outwardly. The cable is then pulled taut, whereupon the spring via the button bites into the cable, to prevent it from sliding through the seat in tho opposite direction. When it is desired to release the cable, it is necessary to pull the end of the cable outwardly, past the button.

The difficulty with this, however, is that if the cable is under a heavy load it can be loosened only with difficulty, because the efforts to pull it out from the hook are resisted by the load. Moreover, the clamping is entirely dependent on frictional engagement between the button and the cable. If the load carried by the rope is small, the clamping force may be weak, and it becomes necessary to press the clamp into clamping position in order to bring it into a secure grip with the rope. Moreover, the leaf spring makes the device sensitive to the strength of the spring, and since spring force weakens with age, the clamping effect may eventually become insecure. Moreover, the clamping is subject to mechanical malfunction.

The clamp provided by the invention overcomes these difficulties, by utilizing not only frictional forces but also the load applied to the rope material itself to hold the clamping device in the clamping position.

The clamp in accordance with the invention is designed for use with any rope material, including rope, cable, bands, straps, and like materials of relatively large or wide diameter, all of which are encompassed herein generically by the term "rope material".

The clamp in accordance with the invention comprises, in combination:

(a) first and second clamping members, of which at least one is movable towards and away from the other between clamping and releasing positions in a swinging movement about a pivot point;

(b) the first clamping member having an opening therethrough for reception of a length of rope material to be held in a fixed position and having side walls on opposite sides thereof;

(c) the length of rope material engaging one side wall of the opening through the first clamping member;

(d) the second clamping member having a clamping extension projecting into the opening through the first clamping member when the first and second clamping members are in the clamping position, and spaced away from the opening when the members are in the releasing position;

(e) a side wall of the extension when the second clamping member is in the clamping position being spaced from the side wall of the opening engaging the length of rope material a distance sufficient to engage and clamp the length in a fixed position between the extension side wall and the opening side wall;

(f) the first clamping member being shaped at one end so as to define a pivot support and the second clamping member being shaped at one end so as to define a pivot movable in the support so as to swing the other end thereof including the clamping extension between the clamping and releasing positions; and (g) gripping means on the first clamping member at an end portion opposite the pivot point for swinging the member into and away from the clamping position.

In a preferred embodiment, the second clamping member has a second opening in alignment with the opening in the first clamping member in both the clamping and releasing positions for reception both of the length of rope material to be clamped in a fixed position and also a second length of rope material; the second length of rope material forming a loop about the first and second clamping members at the pivot support and via the first and second openings so as to hold the members together, the loop of rope material being movable between the loose and taut positions, so as when loose to permit swinging movement of the first member and when taut to hold the first member and second member in the clamping position.

A preferred embodiment of the invention is illustrated in the drawings, in which:

FIG. 1 is a plan view of a first clamping member in accordance with the invention;

FIG. 2 is a cross-section of the member shown in FIG. 1, taken along the line II—II of FIG. 1, and looking in the direction of the arrows;

FIG. 3 is a plan view of a second clamping member in accordance with the invention, including the clamping extension;

FIG. 4 is a cross-sectional view of the clamping member shown in FIG. 3, taken along the line IV—IV in FIG. 3, and looking in the direction of the arrows;

The first clamping member shown in FIGS. 1 and 2 is made up of a rectangular plate 1 of metal such as stainless steel or iron, having one end turned to form a lug 2 extending outwardly at a 90° angle to the main portion of the member, and defining a support for the pivoting end 7 of the second clamping member 5 shown in FIGS. 3 and 4.

Figure 5:
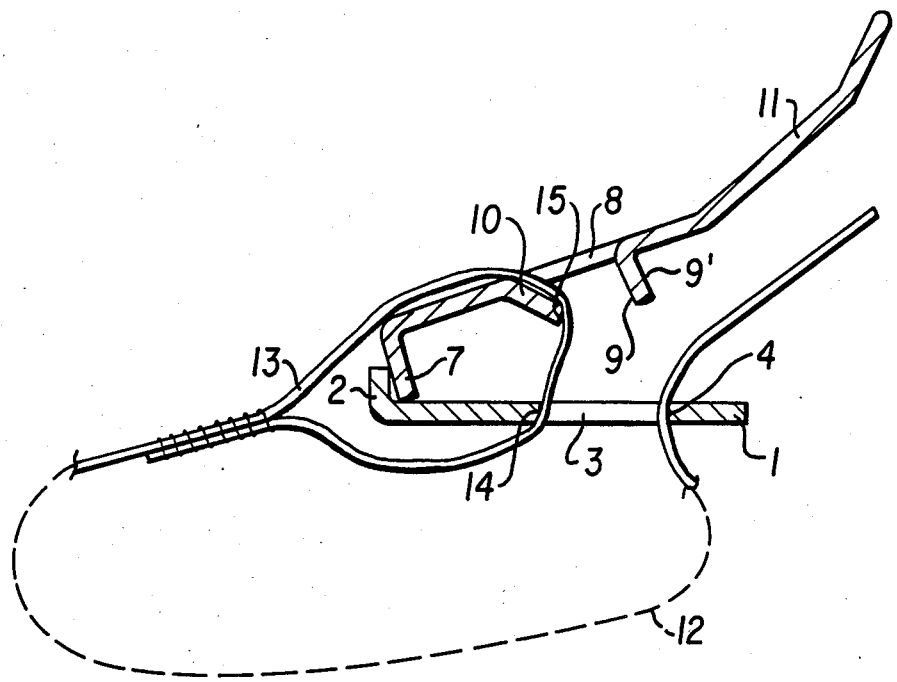
FIG. 5 shows the assembled clamping members of FIGS. 1 to 4 in operative connection and in the released position.
Figure 6:
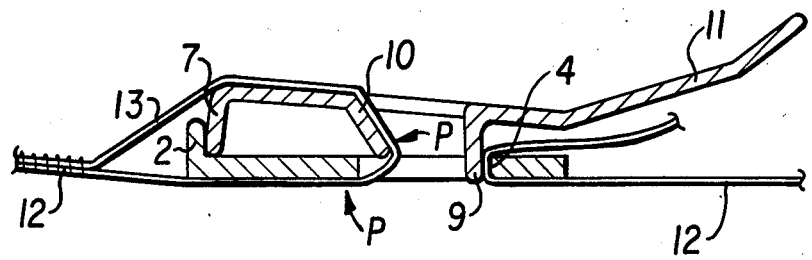
FIG. 6 shows the assembled clamping members of FIGS. 1 to 4 in operative connection and in the clamping position.

The plate 1 has a rectangular opening 3, whose opposed side walls 4,14 are staight, and serve as the bearing surface for a flat rope, i.e., a metal band, passing through the opening in a loop 13, as seen in FIGS. 5 and 6. If the rope is cylindrical, the side wall 4 should be not straight but rounded, to conform to the external periphery of the rope, with a radius of curvature corresponding to the radius of the rope.

While the opening 3 as shown in FIG. 1 is closed, one side can be open, so as to define a hook with a slot, so that the rope can be slipped into the opening instead of having to be threaded through the opening, as seen in FIGS. 5 and 6.

The second clamping member shown in FIGS. 3 and 4 is also in the form of a flat plate of metal such as stainless steel or iron, and is turned at one end to define a lug 6 extending outwardly at a 90° angle to the plate. The lug 6 is slightly longer than the lug 2 of the first clamping member 1, as is apparent from FIGS. 5 and 6.

The tip 7 of the lug 6 serves as a pivot point, and is supported in the trough 2, defined by the lug 2 and adjacent portion of the plate 1 of the first clamping member, so that when the members 1,5 are put together, the pivot end 7 can pivot in the support, as seen in FIGS. 5 and 6. The length of the lugs determines the spacing of the two clamping members at their pivoting ends.

The second clamping member has an opening 8 therethrough with two extensions 9,10 extending outwardly from the side walls thereof, in this case in the form of tongues 9,10 formed and turned outwardly by slitting the sides of the opening 8 and then bending them to the position shown in FIG. 4.

The extension or tongue 9 defines a clamp, which cooperates at side wall 9' with the side wall 4 of the opening 3 through the first clamping member 1, so that when the member 5 is in the clamping position shown in FIG. 6, the rope material 12 is firmly and fixedly held between the extension wall 9' and the side wall 4 by frictional forces.

The end 11 of the member 5 opposite the pivot end 7 is also bent slightly, so as to define a grip, which can be used to move the clamping member 5 manually into and out from the clamping position, as seen in FIG. 6.

The tongue or extension 10 on the other side of the opening 8 of the second clamping member 5 is not essential, and can be omitted. It serves as a guide for the loop 13 of rope material that passes through openings 3,8 of each clamping member.

As shown by dashed lines in FIG. 5, the loop 13 can be at one end of the rope 12, but it need not be.

In operation, the two clamping members are placed with lugs 2,7 facing each other in the position shown in FIG. 5 and one end of rope material 12 passed through each of the openings and tied back to itself to form a loop 13, that is loose, as seen in FIG. 5, with the device in the released position. In this position, the lug 6 and pivot point 7 of the second clamping member 5 normally rest in the trough 2 defined by the lug 2 of the first clamping member 1. The other end of rope material 12 which is to be clamped in position is then threaded through the opening 3 of the first clamping member, but on the opposite side. This is easily done with the clamping members in the position shown in FIG. 5.

As seen in FIG. 6, the side wall 9' of the clamping extension 9 of the second clamping member 5 is spaced a distance from the side wall 4 of the opening 3 through the first clamping member 1 that is slightly less than the thickness of the rope 12 so that the rope is compressed between the extension wall and the side wall, when the clamping member is brought into the clamping position shown in FIG. 6. At the same time, when the clamping members are brought into this position, the loop 13 of rope material is drawn taut, and this holds the members together at their pivot ends, and also produces a pressure force on the other ends of the members, tending to hold them in the clamping position. The members are also held spaced apart in the position shown in FIG. 6 by a distance equal to the length of the lug 6 on the second clamping member 5.

The device consequently is retained in the clamping position not only by the friction forces created in engagement of the rope by the clamping extension 9' and the side wall 4 of the opening 3 of the first clamping member 1, but also by the pressure forces exerted by the taut rope 13 encircling the pivot end of the device.

In the device shown in FIG. 6 the pressure forces are relatively small, since the juxtaposed sides of the openings 3,8 through the clamping members are relatively close to each other, at P.P. These pressure forces can be increased and a relatively large moment created by removing the tongue 10, so that the side wall of the opening 8 is moved back to the plate, and so spaced relatively far away from the side wall of the opening 3 through the first clamping member, but in this case the force required to move the grip 11 to open the clamp will also be larger. Nonetheless, even when the distance between the side walls of the openings through the two members in the clamping position is relatively great, the force required to open the device and bring the clamping members into the released position is relatively small, compared to the devices of the prior art. In general, compared to such devices, the force required to open the clamp can be regarded as small, with the result that the clamp can be quickly opened from the clamping position shown in FIG. 6, to bring it into the released position shown in FIG. 5.

Figure 7:
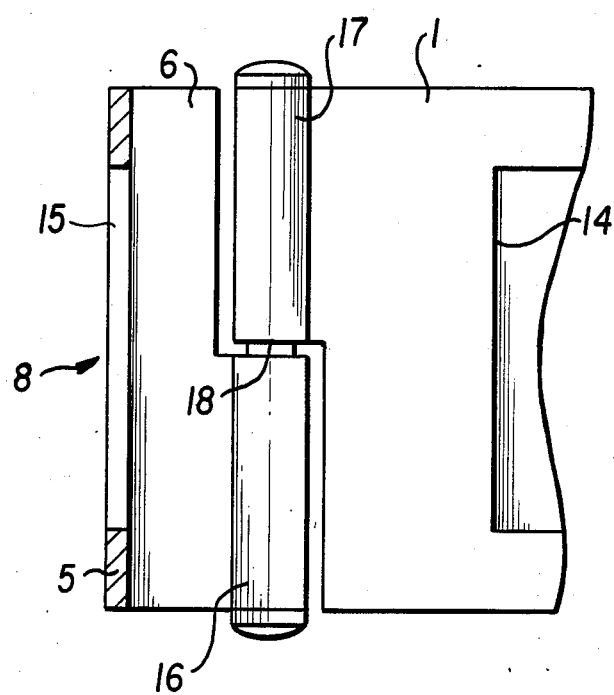
FIG. 7 shows in detail the pivoting ends of a pair of hinged clamping members of the invention.

The modified pivot support structure shown in FIG. 7 does not include the loop 13 or the extension or tongue 10 of the side wall from the opening 8 of the second clamping member 5. In this embodiment, the pivoting ends of the two clamping members are formed in the manner of a hinge, with a cylindrical hinge socket on each plate 1,5, supported on a hinge pin 18 which defines the pivot axle, and are therefore mechanically connected to each other. The pivot ends are accordingly held in the same relative positions, and the sides 4,14 of the openings 3,8 through the clamping members are also held in the same relative positions, with respect to each other, and move along the same arc described about the pivot point.

Preferably, the edges of the openings 3,8, through each of the clamping members are so arranged that when the clamping members are in the clamping position. they lie parallel to each other.

While the openings 3,8 as shown are fully open, they can be reduced in size by introducing a divider extending across them and separating them into two compartments, in the case of opening 3 thus separating the loop 13 from the length 12 to be clamped.

While the clamping extension and side wall 4 can be flat and smooth, as shown, either or both can also be ribbed, knurled, dimpled or serrated, so as to improve its grip on the rope 12.

Other variations will be apparent to those skilled in this art.

Having regard to the foregoing disclosure, the following is claimed as the inventive and patentable embodiments thereof:

1. A clamp for securely holding rope, cable and similar material in a fixed position, comprising:
    (a) first and second clamping members of which at least one is movable towards and away from the other between clamping and releasing positions in a swinging movement about a pivot point;
    (b) the first clamping member having a first opening for reception of a length of rope material and having side walls on opposite sides thereof;
    (c) the second clamping member having a second opening in alignment with the first opening in both the clamping and releasing positions for reception both of the length of rope material and also a loop of the rope material to be clamped in a fixed position;
    (d) each of the first and second openings having side walls on opposite sides thereof;
    (e) the length of rope material engaging the side wall on the same side of the opening in the first clamping member; and the loop of rope material engaging the side walls of the first and second openings on the sides opposite the side walls engaging the length;
    (f) the second clamping member having a clamping extension projecting into the first opening through the first clamping member when the first and second clamping members are in the clamping position, and spaced away from the opening when the members are in the releasing position;
    (g) the extension when the first clamping member is in the clamping position being spaced from the side wall of the opening engaging the length of rope material a distance sufficient to engage and clamp the length in a fixed position between the extension and the side wall;
    (h) the first clamping member being shaped at one end so as to define a pivot support and the second clamping member being shaped at one end so as to define a pivot movable in the support so as to swing the other end thereof including the clamping extension between the clamping and releasing positions; and
    (i) the loop being looped through the first and second openings about the pivot point of the first and second clamping members at the pivot support and via the first and second openings so as to hold the members together, the loop of rope material being the sole attachment holding the first and second clamping members together and being movable between loose and taut positions, so as when loose to permit swinging movement of the first member and disengagement of the rope material being clamped and when taut to hold the first member and second members in the clamping position, and prevent disengagement thereof so as to securely hold the rope material in a fixed position.

2. A clamp according to claim 1 including gripping means on the second clamping member at an end portion opposite the pivot point for manually swinging the member into and away from the clamping position.

* * * * *